(12) United States Patent
Lee et al.

(10) Patent No.: US 11,975,571 B2
(45) Date of Patent: May 7, 2024

(54) TIRE

(71) Applicant: Hankook Tire & Technology Co., Ltd., Seongnam-si (KR)

(72) Inventors: Myong Joong Lee, Yongin-si (KR); Kwang Su Lee, Daejeon (KR)

(73) Assignee: Hankook Tire & Technology Co., Ltd., Gyeonggi-Do (KR)

(*) Notice: Subject to any disclaimer, the term of this patent is extended or adjusted under 35 U.S.C. 154(b) by 0 days.

(21) Appl. No.: 17/573,871

(22) Filed: Jan. 12, 2022

(65) Prior Publication Data

US 2022/0219494 A1  Jul. 14, 2022

(30) Foreign Application Priority Data

Jan. 14, 2021  (KR) .......................... 10-2021-0005535

(51) Int. Cl.
*B60C 13/00* (2006.01)

(52) U.S. Cl.
CPC .................................. *B60C 13/001* (2013.01)

(58) Field of Classification Search
CPC .................................................. B60C 13/001
See application file for complete search history.

(56) References Cited

U.S. PATENT DOCUMENTS

| | | | |
|---|---|---|---|
| 8,875,763 B2 | 11/2014 | Paturle | |
| 9,090,130 B2 | 7/2015 | Kojima et al. | |
| 2008/0283169 A1* | 11/2008 | Sato | ..................... B60C 13/001 |
| | | | 152/450 |
| 2020/0031174 A1 | 1/2020 | Lejeune et al. | |

FOREIGN PATENT DOCUMENTS

| | | |
|---|---|---|
| DE | 10 2019 207908 A1 | 12/2020 |
| EP | 1859963 B1 | 4/2010 |
| EP | 2204296 B1 | 4/2012 |
| EP | 1310384 B1 | 1/2014 |
| EP | 2691246 B1 | 3/2015 |
| EP | 2614968 B1 | 4/2018 |
| EP | 3412477 A1 | 12/2018 |
| EP | 3010729 B1 | 10/2019 |

(Continued)

OTHER PUBLICATIONS

Koyama, English Machine Translation of JP 2017081305, 2017 (Year: 2017).*

(Continued)

*Primary Examiner* — Katelyn W Smith
*Assistant Examiner* — Brendon Charles Darby
(74) *Attorney, Agent, or Firm* — Knobbe, Martens, Olson & Bear, LLP

(57) ABSTRACT

The present disclosure relates to a tire having characters such as a brand name, a model name, etc. engraved on a sidewall thereof.

The tire of the present disclosure includes a plurality of knurling units that includes: a first knurling part that is convex; a second knurling part that continues from a side of the first knurling part and is convex; a third knurling part that continues from a side of the second knurling part and is convex; and a fourth knurling part that is convex and is continuously connected from a side of the third knurling part to another side of the first knurling part.

12 Claims, 4 Drawing Sheets

(56) References Cited

FOREIGN PATENT DOCUMENTS

| | | | |
|---|---|---|---|
| EP | 3166803 | B1 | 10/2019 |
| EP | 3730317 | A1 | 10/2020 |
| JP | 3733054 | B2 | 1/2006 |
| JP | 4229320 | B2 | 2/2009 |
| JP | 2010-188931 | | 9/2010 |
| JP | 4673113 | B2 | 4/2011 |
| JP | 5026840 | B2 | 9/2012 |
| JP | 5230229 | B2 | 7/2013 |
| JP | 2013 216119 | A | 10/2013 |
| JP | 5642795 | B2 | 12/2014 |
| JP | 2016-155504 | | 9/2016 |
| JP | 2017 001437 | A | 1/2017 |
| JP | 2017081305 | A | 5/2017 |
| JP | 2017081305 | A * | 5/2017 |
| JP | 6150310 | B2 | 6/2017 |
| JP | 6281598 | B2 | 2/2018 |
| JP | 2019-104386 | | 6/2019 |
| JP | 2019 218027 | A | 12/2019 |
| JP | 6615046 | B2 | 12/2019 |
| KR | 10 1702431 | B1 | 2/2017 |
| WO | WO 2013/113526 | A1 | 8/2013 |

OTHER PUBLICATIONS

Extended European Search Report issued in EP 22151511.7 dated Jun. 21, 2022.

Office Action issued for JP patent application Serial No. 2022-004118, dated Jun. 17, 2023, with English machine translation.

JP Decision to Grant for Application No. 2022-004118, dated Jun. 6, 2023.

KR Office Action for Application No. 10-2021-0005535, dated Apr. 18, 2023.

* cited by examiner though the gaps of serrations are close, there is a problem that particles may be stuck in the gaps of the serrations.

TIRE

CROSS REFERENCE TO RELATED APPLICATION

The present application claims priority to Korean Patent Applications No. 10-2021-0005535 filed on Jan. 14, 2021, the entire contents of which are incorporated herein for all purposes by this reference.

TECHNICAL FIELD

The present disclosure relates to a tire and, more particularly, to a tire having characters such as a brand name, a model name, etc. engraved on a sidewall thereof.

BACKGROUND

In general, other than tire information such as tire dimensions, a manufacture date, a manufacture factory, maximum speed and load, etc., a diagonal pattern, company and model logos, other decorations, etc. related to the external appearance may be marked on a side of a tire.

In order to set off the decoration with an advantage, colors such a white were added or a fine groove, prominence and depression, etc. were included to make a difference from flat portions, thereby visually applying a difference.

However, the patterns on the sides of tires substantially do not look different much from other parts under an environment with an external light source such as the sun, so there is a problem that the effect is small.

Various research projects for a technology of controlling the shape and structure of patterns that are formed on the sides of tires have been conducted to solve this problem.

For tires manufactured through common processes, the patterns forming a brand name, a model name, etc. were formed by cross-sections composed of repeated common straight lines.

A high-contrast tire pattern and a production method thereof are disclosed in European Patent No. 2483088 in the related art.

In this document, it is described that when the gaps between serrations are made close, contrast is improved.

However, although contrast can be improved by making the gaps of serrations close, there is a problem that particles may be stuck in the gaps of the serrations.

Further, there is a problem that maintenance such as a difficult cleaning method is required to remove particles stuck in the gaps of serrations.

SUMMARY

The present disclosure has been made in an effort to solve the problems and an objective of the present disclosure is to provide a tire that can be given excellent visibility by securing high contrast, that can be easily maintained, and of which the quality of external appearance can be improved.

A tire according to an embodiment of the present disclosure includes a plurality of knurling units that includes: a first knurling part that is convex; a second knurling part that continues from a side of the first knurling part and is convex; a third knurling part that continues from a side of the second knurling part and is convex; and a fourth knurling part that is convex and is continuously connected from a side of the third knurling part to another side of the first knurling part.

The tire may include the plurality of knurling units on any one or more of an edge and a side.

The first knurling part, the second knurling part, the third knurling part, and the fourth knurling part may be asymmetrically formed up, down, left, and right.

The first knurling part, the second knurling part, the third knurling part, and the fourth knurling part may be formed in the same shape.

The first knurling part, the second knurling part, the third knurling part, and the fourth knurling part may be formed around the same apex.

The first knurling part, the second knurling part, the third knurling part, and the fourth knurling part each may be formed in triangular pyramid shape.

The length of an edge of the bottom of the knurling unit may be 0.1 mm~5.0 mm.

The length of the height of the knurling unit may be 0.1 mm~1.0 mm.

According to the present disclosure, there is an effect that it is possible to improve the degree of blackness in comparison to the related art.

According to the present disclosure, there is an effect that contrast is improved, as compared with the related art, so visibility is improved.

According to the present disclosure, there is an effect that the degree of protrusion of a knurling unit is minimized, as compared with the related art, which is advantageous in terms of aerodynamics and improves the fuel efficiency of a vehicle.

According to the present disclosure, there is an effect that it is possible to improve durability of a knurling unit in comparison to the related art.

According to the present disclosure, since a cleaner is not stuck in a mold for manufacturing a tire, sandblasting can be used for cleaning, so there is an effect that a cleaning price and a cleaning time are reduced in comparison to the related art, which can achieve cost efficiency.

According to the present disclosure, there is an effect of a high touch feeling like a fabric is implemented, so the more aesthetic external appearance is achieved.

DETAILED DESCRIPTION

Figure 1:
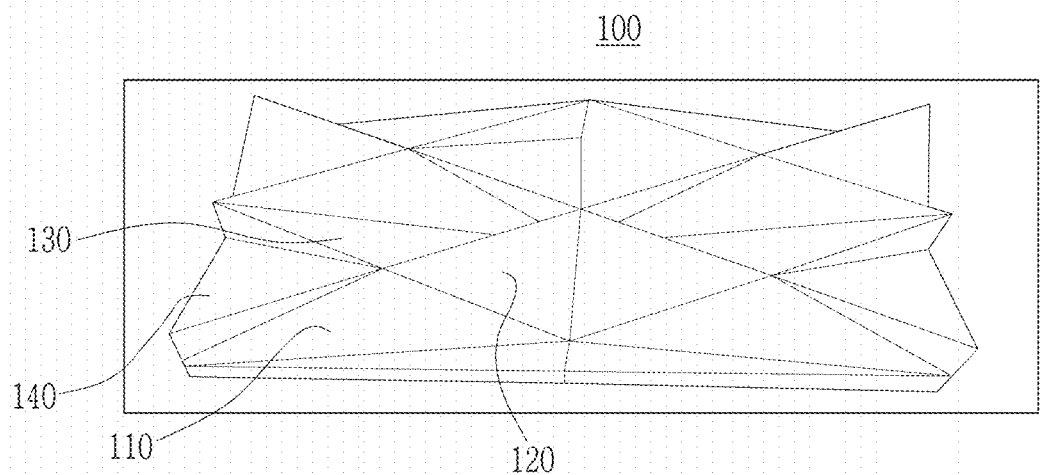
FIG. 1 is a perspective view schematically showing a plurality of knurling units according to an embodiment of the present disclosure.

Hereinafter, a tire according to exemplary embodiments of the present disclosure is described in detail with reference to the accompanying drawings.

The terms and words used in the present specification and claims should not be interpreted as being limited to typical meanings or dictionary definitions, but should be interpreted as having meanings and concepts relevant to the technical scope of the present invention based on the rule according to which an inventor can appropriately define the concept of the term to describe most appropriately the best method he or she knows for carrying out the invention. Therefore, the configurations described in the embodiments and drawings of the present disclosure are merely the most preferable embodiments but do not represent all of the technical spirit of the present invention. Thus, it should be understood that the present disclosure should be construed as including all the changes, equivalents, and substitutions included in the spirit and scope of the present disclosure at the time of filing this application. The size of components or specific portions of the components are exaggerated, omitted, or schematically shown in the drawings for convenience and clarity of description. Accordingly, the sizes of components do not completely reflect the actual sizes. Detailed description of well-known functions or configurations is not described when it may make the subject of the present disclosure unclear.

FIG. 1 is a perspective view schematically showing a plurality of knurling units according to an embodiment of the present disclosure.

As shown in FIG. 1, a tire according to an embodiment of the present disclosure includes a plurality of knurling units 100 including a first knurling part 110 that is convex, a second knurling part 120 that continues from a side of the first knurling part 110 and is convex, a third knurling part 130 that continues from a side of the second knurling part 120 and is convex, and a fourth knurling part 140 that is convex and is continuously connected from a side of the third knurling part 130 to another side of the first knurling part 110.

The first knurling part 110 may be convexly formed in a triangular pyramid shape.

The first knurling part 110 may be asymmetrically formed up, down, left, and right. That is, the upper end of the first knurling part 110 may be biased to a side.

The first knurling part 110, the second knurling part 120, the third knurling part 130, and the fourth knurling part 140 may be formed in the same shape.

The first knurling part 110, the second knurling part 120, the third knurling part 130, and the fourth knurling part 140 may be connected to each other around the same apex.

The knurling unit 100 composed of the first knurling part 110, the second knurling part 120, the third knurling part 130, and the fourth knurling part 140 may form a vane shape.

Figure 2:
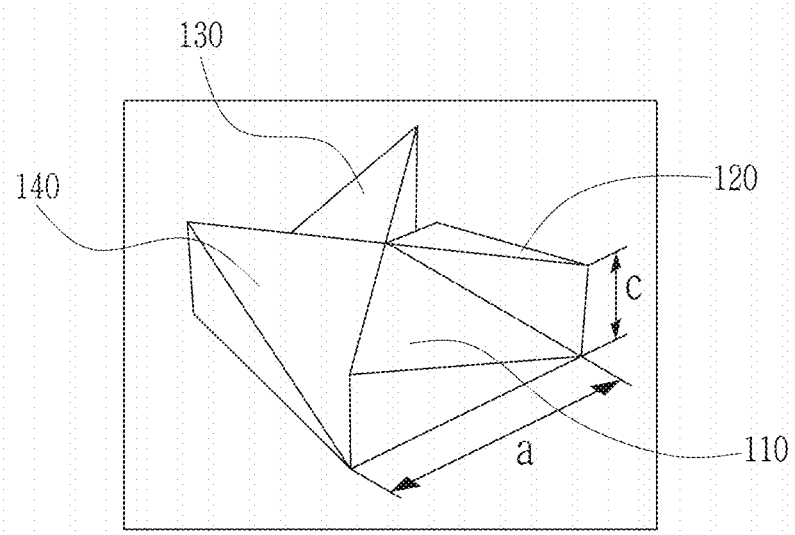
FIG. 2 is a perspective view showing only one knurling unit separated from FIG. 1.

FIG. 2 is a perspective view showing only one knurling unit separated from FIG. 1.

As shown in FIG. 2, the knurling unit 100 is formed such that the first knurling part 110, the second knurling part 120, the third knurling part 130, and the fourth knurling part 140 are connected to each other around one apex.

The first knurling part 110, the second knurling part 120, the third knurling part 130, and the fourth knurling part 140 may be formed in the same shape with the same size, and the length of the height 'c' of the first, second, third, and fourth knurling parts 110, 120, 130, and 140 may be 0.1 mm~1.0 mm.

That is, the length of the height 'c' of the first, second, third, and fourth knurling parts 110, 120, 130, and 140 may be the convex height of the knurling unit 100.

When the length of the height 'c' of the first, second, third, and fourth knurling parts 110, 120, 130, and 140 is 0.1 mm~1.0 mm, the height of the knurling unit 100 that is convexly formed on a tire can be minimized, which is advantageous in terms of aerodynamics of the tire.

The length of an edge 'a' of the bottom of the knurling unit 100 may be 0.1 mm~5.0 mm.

That is, the length of the edge 'a' connecting two apexes except for the apex shared by the first, second, third, and fourth knurling parts 110, 120, 130, and 140 may be 0.1 mm~5.0 mm.

When the length of the edge 'a' connecting two apexes of the bottom except for the apex shared by the first, second, third, and fourth knurling parts 110, 120, 130, and 140 is 0.1 mm~5.0 mm, the knurling unit 100 is formed a relatively small component, which may be advantageous in terms of aerodynamics of a tire.

The inclination of the upper portion forming the triangular pyramid of the first knurling part 110, second knurling part 120, third knurling part 130, and fourth knurling part 140 may be 60°~90°.

That is, when the inclination of the upper portion forming the triangular pyramid of the first knurling part 110, second knurling part 120, third knurling part 130, and fourth knurling part 140 is 60°~90°, it is possible to minimize the size of the knurling unit 100 and maximize visibility of the knurling unit 100.

A plurality of knurling units 100 form a micro knurling structure on a tire, whereby it is possible to improve the quality of external appearance of the tread and the sidewall of a tire and improve the performance the tire.

Figure 3:
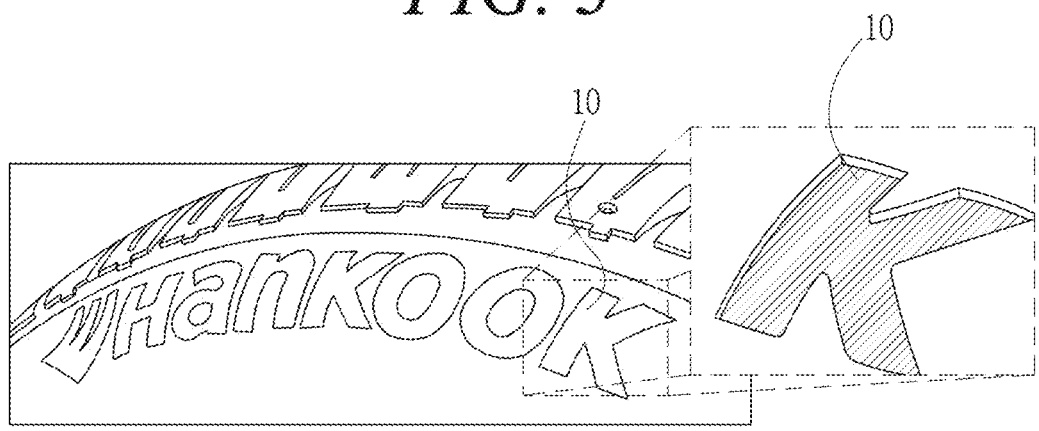
FIG. 3 is a partially enlarged view showing engraved characters, etc. on a tire in the related art.

FIG. 3 is a partially enlarged view showing engraved characters, etc. on a tire in the related art.

As shown in FIG. 3, a character 10, such as a brand name and a model name that are engraved on a sidewall of a tire in the related art, etc., forms a structure extending straightly like serrations on a tire to improve contrast for securing visibility.

Figure 4:
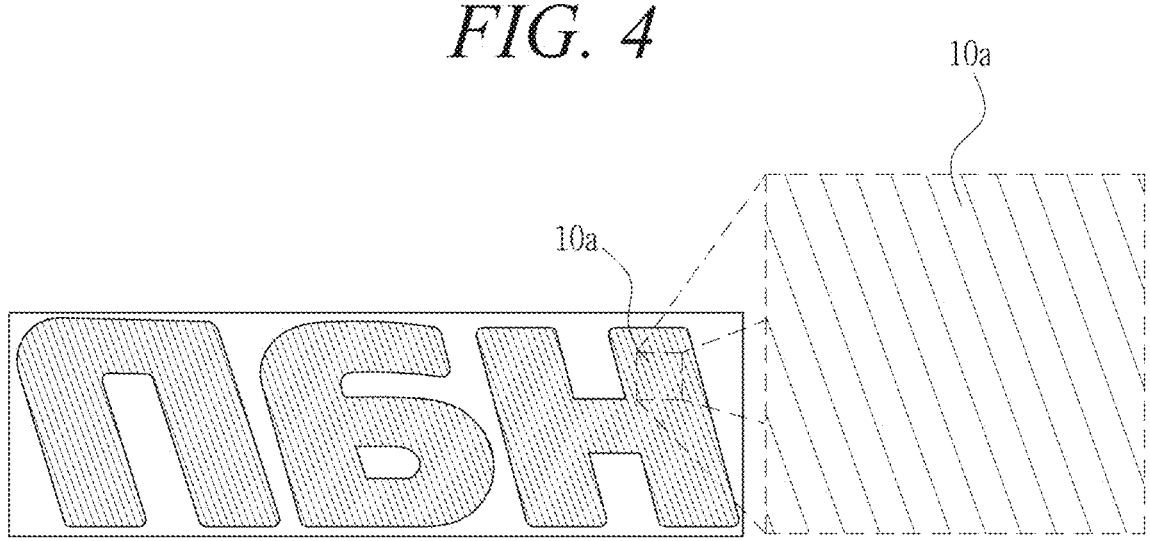
FIG. 4 is an enlarged view showing a portion of a mold for manufacturing a tire in the related art.
Figure 5:
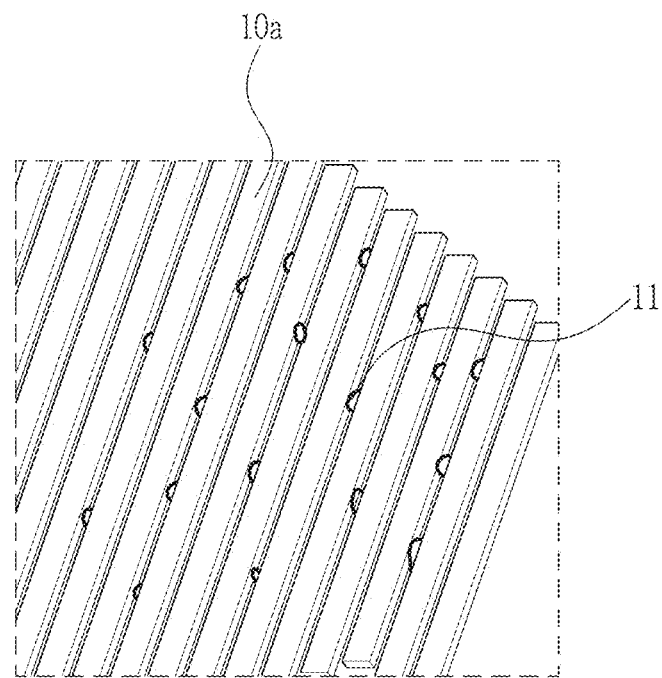
FIG. 5 is a partially enlarged view showing portions with cleaner stuck therein of a mold for manufacturing a tire in the related art.

FIG. 4 is an enlarged view showing a portion of a mold for manufacturing a tire in the related art, and FIG. 5 is a partially enlarged view showing portions with cleaner stuck therein of a mold for manufacturing a tire in the related art.

As shown in FIGS. 4 and 5, straight serrations are formed on the portion of a mold 10a for forming a sidewall portion of a tire of the related art.

The mold 10a should be cleaned when it is used over a predetermined number of times. According to sandblasting that is used to clean the mold 10a by spraying sand, cleaner particles 11 may be stuck in the gaps of a serrated cross-section.

When a tire is manufactured by the mold 10a, there is a problem that the contrast of the detailed design of the character 10 such as brand name and a model name of the tire is decreased.

Figure 6:
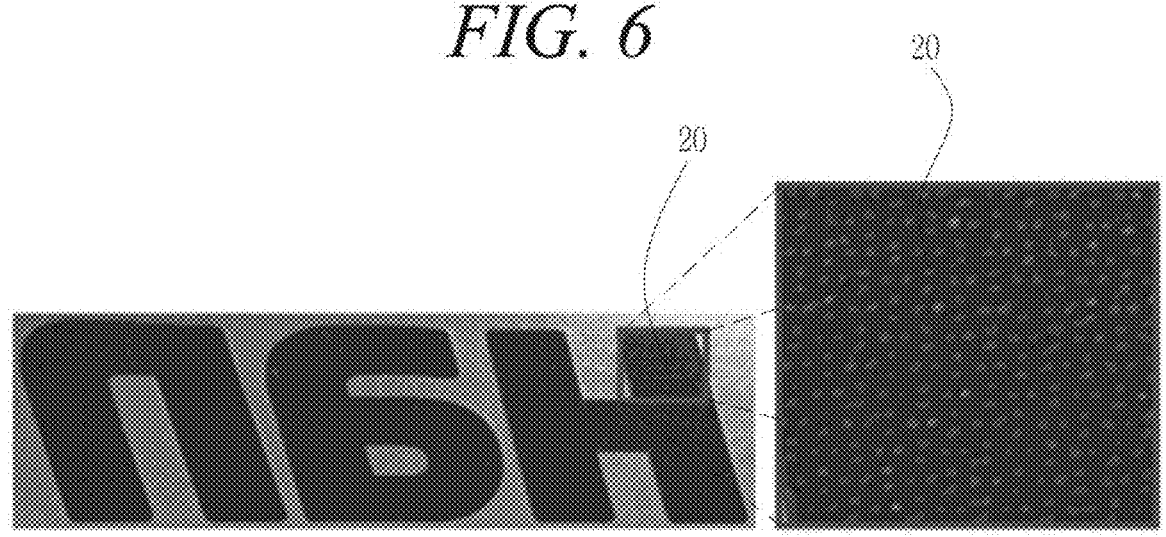
FIG. 6 is an actual picture partially enlarging a character, etc. engraved on a tire according to an embodiment of the present disclosure.

FIG. 6 is an actual picture partially enlarging a character, etc. engraved on a tire according to an embodiment of the present disclosure.

As shown in FIG. 6, a character 20, etc. such as a brand name and a model name that are engraved on a sidewall of a tire according to an embodiment of the present disclosure may form a micro knurling structure having, as a fundamental unit, a plurality of vane-shaped knurling units 100 having a cross-section of a plurality of rotated triangular pyramids to secure visibility.

A micro knurling structure having a multi-directional cutting structure can absorb light and improve the degree of blackness of a surface.

A high touch feeling like a fabric can increase visibility and achieve a more aesthetic external appearance of a product.

Figure 7:
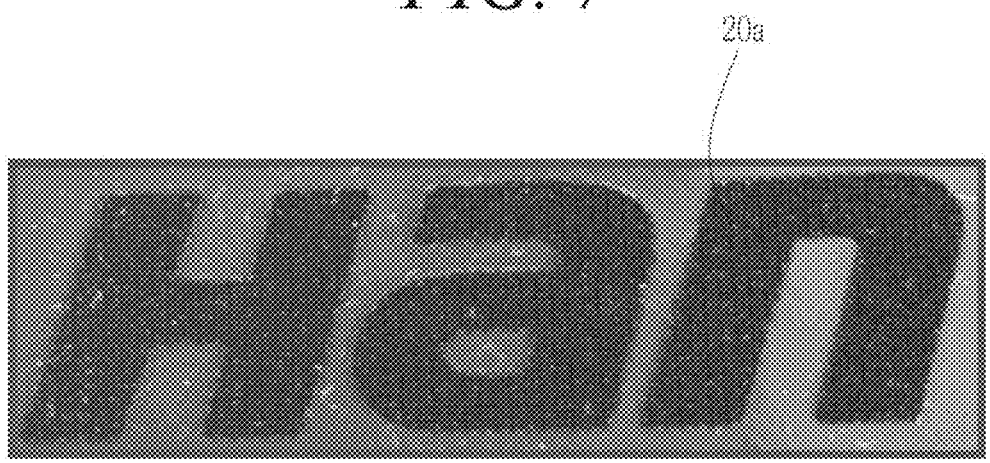
FIG. 7 is an actual picture of a mold for engraving characters, etc. on a tire according to an embodiment of the present disclosure.

FIG. 7 is an actual picture of a mold for engraving characters, etc. on a tire according to an embodiment of the present disclosure.

As shown in FIG. 7, a mold 20a for forming a micro knurling structure on a tire forms a plurality of cross-sections of rotated triangular pyramids that are asymmetric up, down, left, and right. Accordingly, even though the mold is cleaned by sandblasting that sprays sand, a cleaner is not stuck in the cross-sections, so the cleaning price and cleaning time are decreased, whereby efficiency can be increased in terms of cost.

According to the present disclosure, there is an effect that it is possible to improve the degree of blackness as compared with the existing serration structure.

According to the present disclosure, there is an effect that contrast is improved, as compared with the related art, so visibility is improved.

According to the present disclosure, there is an effect that the degree of protrusion of a knurling unit is minimized, as compared with the related art, which is advantageous in terms of aerodynamics and improves the fuel efficiency of a vehicle.

For example, the existing serration structure protrudes more than 0.4 mm from a tire, but the micro knurling structure of the present disclosure can protrude less than 0.2 mm from a tire.

According to the present disclosure, there is an effect that it is possible to improve durability of a knurling unit in comparison to the related art.

According to the present disclosure, since a cleaner is not stuck in a mold for manufacturing a tire, sandblasting can be used for cleaning, so there is an effect that a cleaning price and a cleaning time are reduced in comparison to the related art, which can achieve cost efficiency.

According to the present disclosure, there is an effect a high touch feeling like a fabric is implemented, so the more aesthetic external appearance is achieved.

Although a tire according to the present disclosure was described above with reference to exemplary drawings, the present disclosure is not limited to the embodiments and drawings described above and may be achieved in various ways by those skilled in the art within claims.

DETAILED DESCRIPTION OF MAIN ELEMENTS 10, 20: character
10a, 20a: mold
11: cleaner particle
100: knurling unit
110: first knurling part
120: second knurling part
130: third knurling part
140: fourth knurling part
a: edge
c: height

What is claimed is:

1. A tire comprising a plurality of knurling units, each knurling unit including:
   a first knurling part forming a first triangular pyramid shape having a first apex;
   a second knurling part that continues from a side of the first knurling part, the second knurling part forming a second triangular pyramid shape having a second apex;
   a third knurling part that continues from a side of the second knurling part, the third knurling part forming a third triangular pyramid shape having a third apex;
   a fourth knurling part that is continuously connected from a side of the third knurling part to another side of the first knurling part, the fourth knurling part forming a fourth triangular pyramid shape having a fourth apex; and
   wherein each of the first to fourth knurling parts has three base corners and two exposed triangular faces sharing an edge, wherein one end of the shared edge is connected to a respective one of the apexes and the other end of the shared edge is connected to one of the three base corners, wherein the one of the three base corers is raised vertically above the other two of the three base corners.

2. The tire of claim 1, wherein the plurality of knurling units is provided on any one or more of an edge portion and a side of the tire.

3. The tire of claim 1, wherein each of the first knurling part, the second knurling part, the third knurling part, and the fourth knurling part is asymmetrically formed and is biased to one side of the respective knurling part.

4. The tire of claim 1, wherein the first knurling part, the second knurling part, the third knurling part, and the fourth knurling part are formed in the same shape.

5. The tire of claim 1, wherein the first knurling part, the second knurling part, the third knurling part, and the fourth knurling part are formed around a center point.

6. The tire of claim 5, wherein a length of an edge of a bottom of each of the knurling units is 0.1 mm~5.0 mm.

7. The tire of claim 5, wherein the center point coincides with the one of the three base corners of each of the first to the fourth knurling parts that are above the other two of the three base corners.

8. The tire of claim 7, wherein the first apex, the second apex, the third apex, the fourth apex, and the center point have about the same height.

9. The tire of claim 1, wherein a height of each of the knurling units is 0.1 mm~1.0 mm.

10. The tire of claim 1, wherein one of the two exposed triangular faces sharing an edge is steeper than the other of the two exposed triangular faces.

11. A character on the tire according to claim 1, the character comprising:
   the plurality of knurling units.

12. The character of claim 11, wherein the character is located on one or both of an edge portion or a side of the tire.

* * * * *